US011200099B2

United States Patent
Li (10) Patent No.: US 11,200,099 B2
(45) Date of Patent: Dec. 14, 2021

(54) KERNEL CONFIGURATION INFORMATION MANAGEMENT METHOD AND DEVICE, AND ELECTRONIC APPARATUS

(71) Applicant: CLOUDMINDS (SHENZHEN) ROBOTICS SYSTEMS CO., LTD., Shenzhen (CN)

(72) Inventor: Yangang Li, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 348 days.

(21) Appl. No.: 16/427,332

(22) Filed: May 30, 2019

(65) Prior Publication Data
US 2019/0286496 A1    Sep. 19, 2019

Related U.S. Application Data

(63) Continuation of application No. PCT/CN2016/112484, filed on Dec. 27, 2016.

(51) Int. Cl.
| | |
|---|---|
| G06F 9/44 | (2018.01) |
| G06F 9/52 | (2006.01) |
| G06F 9/445 | (2018.01) |
| G06F 9/455 | (2018.01) |
| G06F 9/48 | (2006.01) |
| G06F 11/30 | (2006.01) |
| G06F 11/34 | (2006.01) |

(52) U.S. Cl.
CPC ............ G06F 9/52 (2013.01); G06F 9/44505 (2013.01); G06F 9/45558 (2013.01);
(Continued)

(58) Field of Classification Search
CPC ...................................................... G06F 9/52
(Continued)

(56) References Cited

U.S. PATENT DOCUMENTS

| | | | |
|---|---|---|---|
| 2009/0172667 A1* | 7/2009 | Wang | G09G 5/363 718/1 |
| 2011/0238969 A1* | 9/2011 | Warkentin | G06F 9/4416 713/2 |

(Continued)

FOREIGN PATENT DOCUMENTS

| | | |
|---|---|---|
| CN | 101382908 A | 3/2009 |
| CN | 101477510 A | 7/2009 |

(Continued)

OTHER PUBLICATIONS

International Search Report in the international application No. PCT/CN2016/112484, dated Jul. 28, 2017.

(Continued)

*Primary Examiner* — Timothy A Mudrick
(74) *Attorney, Agent, or Firm* — IPRO, PLLC (57) ABSTRACT

A method for managing kernel configuration information in a multi-operating system (OS) electronic apparatus includes: monitoring whether a present system state of a guest operating system changes; and synchronizing the first kernel configuration information in a kernel of the guest operating system to the second kernel configuration information in a kernel of the host operating system if the guest operating system switches from a foreground state to a background state, or synchronizing the second kernel configuration information in a kernel of the host operating system to the first kernel configuration information in a kernel of the guest operating system if the guest operating system switches from a background state to a foreground state. A kernel configuration information management device having functional modules and an electronic apparatus including the kernel configuration information management device can implement the method.

20 Claims, 7 Drawing Sheets

(52) U.S. Cl.
CPC ............ *G06F 9/485* (2013.01); *G06F 9/4843* (2013.01); *G06F 11/302* (2013.01); *G06F 11/3495* (2013.01); *G06F 2009/45591* (2013.01)

(58) Field of Classification Search
USPC ......................................................... 703/100
See application file for complete search history.

(56) References Cited

U.S. PATENT DOCUMENTS

| | | | | |
|---|---|---|---|---|
| 2012/0144232 | A1* | 6/2012 | Griffith | ............... G06F 11/1482 |
| | | | | 714/4.12 |
| 2014/0325202 | A1 | 10/2014 | Warkentin et al. | |
| 2018/0365081 | A1* | 12/2018 | Zeng | ........................ G06F 11/30 |
| 2019/0129873 | A1* | 5/2019 | Zhao | ........................ G06F 13/20 |

FOREIGN PATENT DOCUMENTS

| | | |
|---|---|---|
| CN | 101996090 A | 3/2011 |
| CN | 105183558 A | 12/2015 |
| WO | 2016134601 A1 | 9/2016 |

OTHER PUBLICATIONS

English translation of the Written Opinion of the International Search Authority in the international application No. PCT/CN2016/112484, dated Jul. 28, 2017.

* cited by examiner

KERNEL CONFIGURATION INFORMATION MANAGEMENT METHOD AND DEVICE, AND ELECTRONIC APPARATUS

CROSS-REFERENCE TO RELATED APPLICATION

The present application is a continuation of International Patent Application No.: PCT/CN2016/112484 filed on Dec. 27, 2016, the disclosure of which is incorporated by reference herein in its entirety.

BACKGROUND

In a multi-operation system including a host operating system (OS) and at least one guest operating system (OS), a kernel of each of the at least one guest operating system includes kernel configuration information, and a kernel of the host operating system includes second kernel configuration information. Herein, the kernel configuration information in a kernel of an operating system is referred to as configuration information provided by the kernel to a user space specifically for the operating system through an operating system call or through an input/output control interface so as to control a device to be managed by the kernel or to control a function of the kernel.

The function modules of any of the at least one guest operating system can be divided into asynchronous function modules and synchronous function modules. An asynchronous function module of one guest operating system is configured to run or to be executed in a manner that does not depend on any corresponding function module in the host operating system, whereas a synchronous function module of one guest operating system is configured to run in a manner depending on a corresponding function module in the host operating system. For example, a display function module in one guest operating system can be a synchronous function module, which runs dependently on a corresponding display function module in the host operating system.

The function modules of the host operating system can also be divided into asynchronous function modules and synchronous function modules. An asynchronous function module of the host operating system is not depended upon by any corresponding function module in any guest operating system, whereas a synchronous function module described herein is depended upon by a corresponding function module in at least one guest operating system. For example, a display function module in the host operating system can be a synchronous function module, which is depended upon by a corresponding display function module in one guest operating system.

An asynchronous function module in one guest operating system may access the kernel configuration information in the kernel of the one guest operating system through a corresponding service in a corresponding user space, and then execute or perform operations (e.g. reading, modification, etc.) over the information involved in the asynchronous function module in the kernel configuration information in the kernel of the one guest operating system. Meanwhile, an asynchronous function module in the host operating system may also access the kernel configuration information in the kernel of the host operating system through a corresponding service in a corresponding user space, and then execute the operations such as reading, modification etc., over the information involved in the synchronous function module in the kernel configuration information in the kernel of the host operating system.

SUMMARY

The present disclosure relates to the technical field of virtualization, and particularly to a kernel configuration information management method, a kernel configuration information management device, and an electronic apparatus.

Embodiments of the disclosure provide a kernel configuration information management method and device, and an electronic apparatus having the kernel configuration information management device, which are mainly utilized to implement synchronization between the kernel configuration information in a foreground guest operating system and the kernel configuration information in a kernel of a host operating system.

In a first aspect, a method for managing kernel configuration information (i.e. kernel configuration information management method) in an electronic apparatus, such as a computing system, is provided. The electronic apparatus has multiple operating systems, which comprise a host operating system and at least one guest operating system. The method includes the following steps:

monitoring whether there is a change of a present system state of any one of the at least one guest operating system; and synchronizing first kernel configuration information in a kernel of the any one of the at least one guest operating system to second kernel configuration information in a kernel of the host operating system if detecting that the present system state of the any one of the at least one guest operating system is switched from a foreground state to a background state, or synchronizing second kernel configuration information in a kernel of the host operating system to first kernel configuration information in a kernel of the any one of the at least one guest operating system if detecting that the present system state of the any one of the at least one guest operating system is switched from a background state to a foreground state.

Herein the present system state of an operating system is referred to as a system state of the operating system at the moment of investigation, which could be a background state or a foreground state.

According to some embodiments of the method, each of the multiple operating systems comprises a system switching module configured to record a present system state thereof. As such, the monitoring whether there is a change of a present system state of any one of the at least one guest operating system comprises: monitoring a content recorded in a system switching module corresponding to the any one of the at least one guest operating system.

Furthermore, the synchronizing second kernel configuration information in a kernel of the host operating system to first kernel configuration information in a kernel of the any one of the at least one guest operating system optionally comprises the following sub-steps:

acquiring the second kernel configuration information by notifying a synchronous function module of the at least one guest operating system through a callback function in the system switching module corresponding to the any one of the at least one guest operating system; and synchronizing the first kernel configuration information with the second kernel configuration information by means of a service corresponding to the synchronous function module in a user space corresponding to the any one of the at least one guest operating system.

According to some embodiments, the above mentioned synchronous function module includes a front end in the any one of the at least one guest operating system and a back end in the host operating system. As such, the acquiring the second kernel configuration information comprises: reading, through a communication between the front end and the back end, information involved in the synchronous function module in the second kernel configuration information in the kernel of the host operating system through an interface provided for the synchronous function module by the host operating system.

Further optionally, the back end is further configured not to access, or perform operations over, the interface when the any one of the at least one guest operating system is run in the background.

In the method, the synchronizing the first kernel configuration information with the second kernel configuration information can optionally include the following sub-steps:

detecting whether there is a difference between the information involved in the synchronous function module in the second kernel configuration information and information involved in the synchronous function module in the first kernel configuration information; and triggering, by means of the system switching module, the synchronous function module to report an event to a corresponding service in the user space to thereby synchronize the information involved in the synchronous function module in the first kernel configuration information with the information involved in the synchronous function module in the second kernel configuration information, if detecting that there is a difference.

According to some embodiments, prior to the step of monitoring whether there is a change of a present system state of any one of the at least one guest operating system, the method further include an initialization process. The initialization process includes the following steps:

setting, upon booting of the host operating system, a present system state of the host operating system as a foreground state, and registering a callback function for each synchronous function module in the host operating system; and setting, upon booting of any of the at least one guest operating system, a present system state of the any of the at least one guest operating system as a background state, and registering a callback function for each synchronous function module of the any of the at least one guest operating system in a system switching module corresponding to the any of the at least one guest operating system.

According to some embodiments, the method further includes: if detecting that one of the multiple operating systems is switched to run to a foreground, updating kernel information in a system service according to kernel information in the kernel of the one of the multiple operating systems.

According to some embodiments, the method further includes: if only detecting that one of at least one guest operating system is run at a foreground, allowing an application program in the one of at least one guest operating system to operate over an application program interface (API) provided by the host operating system to thereby modify kernel information in the kernel of the host operating system.

In a second aspect, the present disclosure further provides a kernel configuration information management device, which is substantially utilized for the implementation of the kernel configuration information management method according to the various embodiments as described above.

The device comprises a monitoring module and a synchronization module. The monitoring module is configured to monitor whether there is a change of a present system state of any one of the at least one guest operating system; and the synchronization module is configured to synchronize first kernel configuration information in a kernel of the any one of the at least one guest operating system to second kernel configuration information in a kernel of the host operating system if detecting that the present system state of the any one of the at least one guest operating system is switched from a foreground state to a background state, or to synchronize second kernel configuration information in a kernel of the host operating system to first kernel configuration information in a kernel of the any one of the at least one guest operating system if detecting that the present system state of the any one of the at least one guest operating system is switched from a background state to a foreground state.

According to some embodiments of the device, the synchronization module comprises a first synchronization sub-module and a second synchronization sub-module. The first synchronization sub-module is configured to synchronize the first kernel configuration information in the kernel of the any one of the at least one guest operating system to the second kernel configuration information in the kernel of the host operating system if detecting that the present system state of the any one of the at least one guest operating system is switched from the foreground state to the background state, whereas the second synchronization sub-module is configured to synchronize the second kernel configuration information in the kernel of the host operating system to the first kernel configuration information in the kernel of the any one of the at least one guest operating system if detecting that the present system state of the any one of the at least one guest operating system is switched from the background state to the foreground state.

In the device, each of the multiple operating systems can comprise a system switching module, which is configured to record a present system state thereof.

Optionally in the device, the system switching module is further configured to trigger a synchronous function module in the each of the multiple operating systems through a callback function therein.

Further optionally in the device, a synchronous function module in any one of the at least one guest operating system comprises a front end in the any one of the at least one guest operating system and a back end in the host operating system. The front end is communicatively coupled to the back end, and the back end is configured to read information involved in the synchronous function module in the second kernel configuration information in the kernel of the host operating system through an interface provided for the synchronous function module by the host operating system.

According to some embodiment of the device, the back end is further configured to allow access to, and operations over, the interface only when the any one of the at least one guest operating system is run in the foreground.

Optionally in the device, the system switching module is further configured to register the callback function upon booting of the each of the multiple operating systems.

In the device, a system switching module in the host operating system can be further configured to set a present system state of the host operating system as a foreground state upon booting of the host operating system; and a system switching module in any of the at least one guest operating system can be further configured to set a present system state of the any of the at least one guest operating system as a background state upon booting of the any of the at least one guest operating system.

According to some embodiments, the device further includes an updating module, which is configured, if detecting that one of the multiple operating systems is switched to run to a foreground, to update kernel information in a system service according to kernel information in the kernel of the one of the multiple operating systems.

According to some embodiments, the device further includes a processing module, which is configured, if only detecting that one of at least one guest operating system is run at a foreground, to allow an application program in the one of at least one guest operating system to operate over an application program interface (API) provided by the host operating system to thereby modify kernel information in the kernel of the host operating system.

In a third aspect, the present disclosure further provides an electronic apparatus that includes the kernel configuration information management device according to the various embodiments as described above.

According to some embodiments, the electronic apparatus comprises a computing system including a memory and one or more processors. The memory is communicatively connected with the one or more processors through a communication bus. The one or more processors are configured to execute one or more computer programs stored in the memory, and the one or more computer programs contain computer-executable instructions used for implementing the kernel configuration information management method as mentioned above.

According to some embodiments, the electronic apparatus may further include a computer-readable storage medium storing the one or more computer programs.

In a fourth aspect, the present disclosure further provides a computer program product that can be used in combination with one of the aforementioned embodiments of electronic apparatus. The computer program product includes one or more computer programs embedded into a computer-readable storage medium, and the one or more computer programs contain instructions configured to enable the electronic apparatus to execute in order to implement the kernel configuration information management method as mentioned above.

According to some embodiments, the computer program product is in a form of a non-transitory computer storage medium storing computer-executable instructions which, when executed on a computer or a processor, cause the computer or processor to carry out any of the embodiments of the kernel configuration information management method as described above in the first aspect.

BRIEF DESCRIPTION OF THE DRAWINGS

Specific embodiments of the disclosure will be described below with reference to the drawings.

DETAILED DESCRIPTION

In order to make the technical solutions and advantages of the present disclosure clearer, exemplary embodiments of the present disclosure will further be described below in combination with the drawings in detail. It is apparent that the described embodiments are not all embodiments but only part of embodiments of the present disclosure. Moreover, the embodiments in the present disclosure and characteristics in the embodiments may be combined without conflicts.

According to conventional technologies such as those described above in the Background, in situations where a synchronous function module of a host operating system running in foreground has executed or performed operations over, and thereby has modified, the kernel configuration information in a kernel of the host operating system before one guest operating system is switched to run from background to foreground, the kernel configuration information in the kernel of the host operating system is thus changed due to the modification of the synchronous function module in the host operating system, yet the kernel configuration information in a kernel of the one guest operating system maintains unchanged. As such, the kernel configuration information in the kernel of the one guest operating system is thus not synchronous with the kernel configuration information in the kernel of the host operating system.

In order to address this aforementioned disadvantage associated with current technologies in the field, a technical approach is disclosed herein and will be described in detail in the following.

Specifically, the present disclosure provides a kernel configuration information management method, a device implementing the kernel configuration information management method (or called "kernel configuration information management device"), an electronic apparatus comprising the kernel configuration information management device, and a computer program product used in combination with an electronic apparatus.

In a first aspect of the present disclosure, a kernel configuration information management method is provided, which can be applied to an electronic apparatus comprising a computing system, and the computing system includes a host operating system (i.e. host OS) and at least one guest operating system (i.e. guest OS). A kernel of each guest operating system includes kernel configuration information, and a kernel of the host operating system also includes kernel configuration information. It is noted that for convenient description, herein and elsewhere throughout the present disclosure, the kernel configuration information in the kernel of one guest operating system is named first kernel configuration information, and the kernel configuration information in the kernel of the host operating system is named second kernel configuration information.

Figure 1:
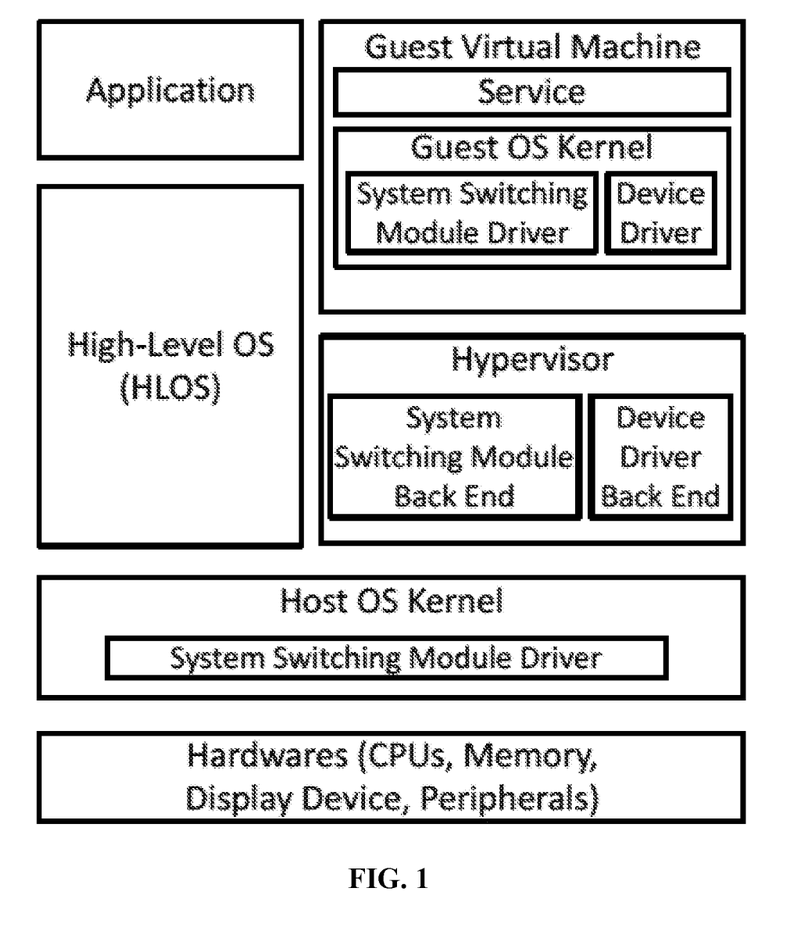
FIG. 1 is a structure diagram of an embedded system according to some embodiment of the disclosure.

Optionally in the computing system, each of the at least one guest operating system may be configured to run in a guest virtual machine, and the computing system may further comprise a hypervisor, or a virtual machine manager (VMM), which provides a running environment for each of the at least one guest operating system. FIG. 1 illustrates an embodiment of the computing system which is substantially an embedded computing system and includes one host operating system (i.e. host OS) and one guest operating system (i.e. guest OS).

In the computing system, each of the operating systems (i.e. the host OS and the at least one guest OS) comprises a system switching module, which is configured to record a current system state of the each operating system.

The system switching module in each guest operating system is further configured, upon detecting that the current system state is changed from a background state to a foreground state, to trigger a synchronous function module of the corresponding operating system (i.e. said each guest operating system) to report an event to a user space corresponding to the each guest operating system. A service corresponding to the synchronous function module in the user space is configured, upon receiving said reported event, to update a content of the first kernel configuration information of the each guest operating system.

The synchronous function module in any one guest operating system comprises a front end in the any one guest operating system and a back end in the host operating system. The back end of the synchronous function module can access, and/or set (i.e. perform operations over) the second kernel configuration information in the host operating system through a synchronous function module interface provided by the host operating system. Herein, the back end is configured to allow access to, and allow operations over, the synchronous function module interface when the any one guest operating system is run in the foreground; and is further configured not to allow access to or operations over the synchronous function module interface when the any one guest operating system is run in the foreground.

Figure 2:
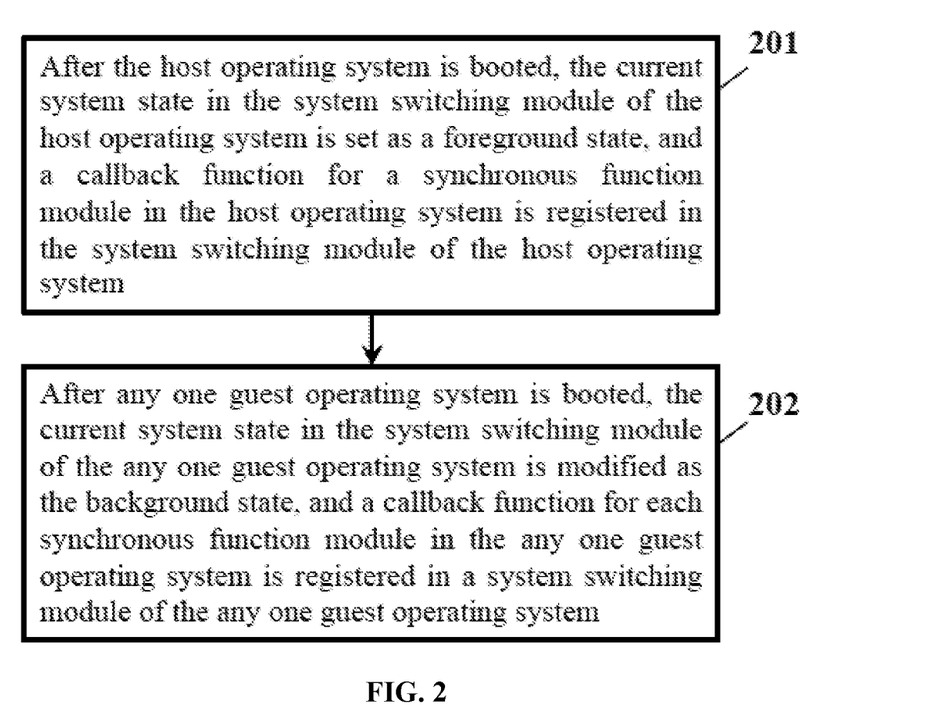
FIG. 2 is a flow chart of a kernel configuration information management method according to one embodiment of the disclosure.

During an initialization stage of the computing system implementing the kernel configuration information management method provided in the present disclosure, the following steps are executed, as shown in FIG. 2.

Step 201 (i.e. S201): after the host operating system is started or booted, the current system state in the system switching module of the host operating system is set as a foreground state, and a callback function for a synchronous function module in the host operating system is registered in the system switching module of the host operating system.

Herein, the synchronous function module in the host operating system is depended upon by a function module of any of the at least one guest operating system. For example, a display function module of the host operating system can be a synchronous function module, and a display function module of a guest operating system depends on it.

The callback function is configured to have the following functions including: reading a content corresponding to the synchronous function module in the kernel configuration information; and reporting, in a form of an event, the content to a user space corresponding to the host operating system.

For example, after booting, the host operating system reads the second kernel configuration information, and starts each service in its user space according to the second kernel configuration information. The current system state in the system switching module of the host operating system is modified as the foreground state. Meanwhile, a callback function for each of the synchronous function modules of the host operating system is registered in the system switching module of the host operating system.

Step 202 (i.e. S202): after any one guest operating system is started or booted, the current system state in the system switching module of the any one guest operating system is modified as the background state, and a callback function for each synchronous function module in the any one guest operating system is registered in a system switching module of the any one guest operating system.

Herein, the synchronous function module in the any one guest operating system depends on a function module in the host operating system. For example, a display function module of a guest operating system can be a synchronous function module, which runs dependently on a display function module of the host operating system.

Figure 3:
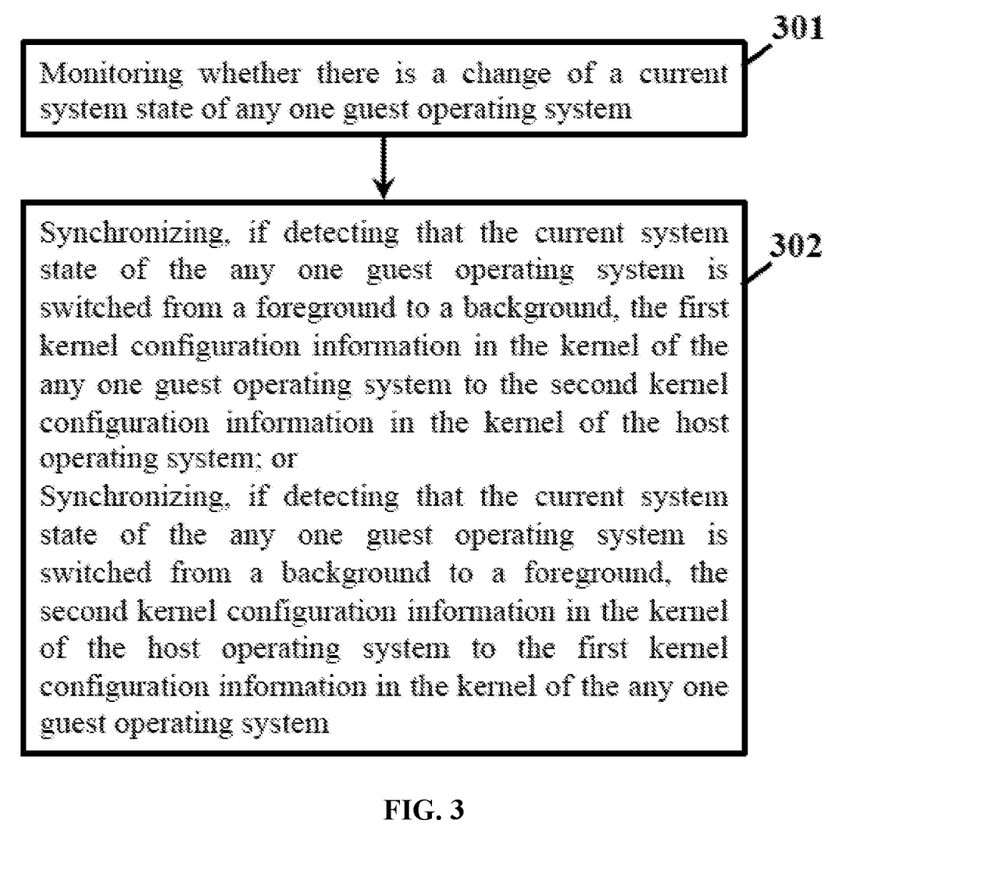
FIG. 3 is a flow chart of a kernel configuration information management method according to yet another embodiment of the disclosure.

After the initialization stage, a flow chart of the kernel configuration information management method provided in the present disclosure is shown in FIG. 3.

Step 301 (i.e. S301): monitoring whether there is a change of a current system state of any one guest operating system; and According to some embodiments of the present disclosure, in an operating system, a corresponding system switching module in the operating system can record the current system state of the operating system, thus when the operating system is switched to run from a foreground to a background or from a background to a foreground, the current system state in the system switching module of the operating system may be modified accordingly. As such, the step of monitoring whether there is a change of a current system state of any one guest operating system in step S301 can, according to some embodiments of the disclosure, be performed through monitoring the content recorded in the system switching module of the any one guest operating system.

It is noted that it is possible that a functional module other than a system switching module in a corresponding operating system, or another functional module in the host operating system as well, can also be utilized to realize the monitoring of whether there is a change of a current system state of an operating system, and thus there could be other embodiments for realization of the step S301.

Step 302 (i.e. S302): synchronizing, if detecting that the current system state of the any one guest operating system is switched from a foreground to a background, the first kernel configuration information in the kernel of the any one guest operating system to the second kernel configuration information in the kernel of the host operating system, or synchronizing, if detecting that the current system state of the any one guest operating system is switched from a background to a foreground, the second kernel configuration information in the kernel of the host operating system to the first kernel configuration information in the kernel of the any one guest operating system.

Specifically, on the one hand, if it is monitored that a guest operating system is switched from the foreground to the background, that is, the foreground operating system is switched, the first kernel configuration information in the kernel of the guest operating system will be synchronized to the second kernel configuration information in the kernel of the host operating system to thereby allow the first kernel configuration information to be same as the second kernel configuration information.

On the other hand, if it is monitored that a guest operating system is switched from the background to the foreground, the second kernel configuration information in the kernel of the host operating system will be synchronized to the first kernel configuration information in the kernel of the guest operating system to thereby allow the second kernel configuration information in the foreground-running guest operating system to be same as the first kernel configuration information.

Optionally, any or both of the above steps S301 and S302 can be performed in the hypervisor, yet other possible embodiments also exist.

In the following, the sub-step of synchronization in the step S301 will be described in more detail.

Figure 4:
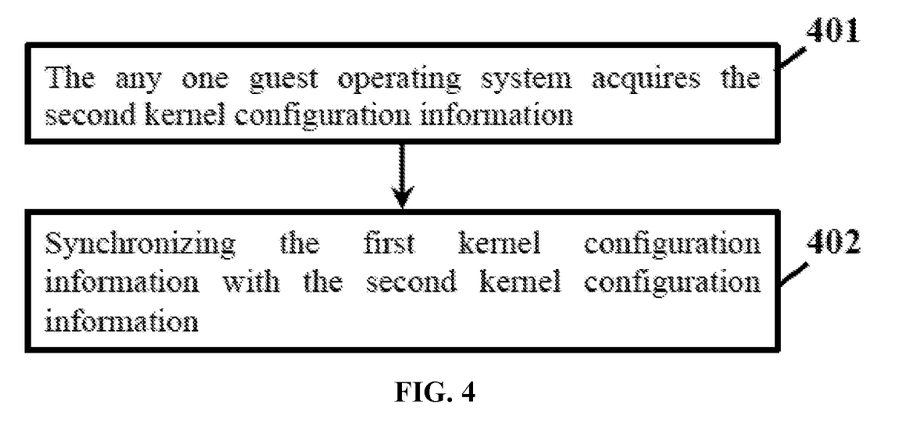
FIG. 4 is a flow chart of sub-steps of one branch of the step S302 of the kernel configuration information management method shown in FIG. 3 according to some embodiment of the disclosure.

Take one illustrating example for the description, where a guest operating system is switched from the background to the foreground. As such, in one embodiment as illustrated in FIG. 4, the sub-step of synchronizing the second kernel configuration information in the kernel of the host operating system to the first kernel configuration information in the kernel of the any one guest operating system can optionally be implemented through the following two sub-steps:

Step 401 (i.e. S401): the any one guest operating system acquires the second kernel configuration information; and Step 402 (i.e. S402): the first kernel configuration information is synchronized with the second kernel configuration information.

According to one embodiment, in step S401, the any one guest operating system can, by means of the callback function in the system switching module, notify the synchronous function module to acquire information involved in the synchronous function module in the second kernel configuration information; and then in step S402, the information involved in the synchronous function module in the first kernel configuration information can, by means of a service corresponding to the synchronous function module in the user space, be synchronized with the information involved in the synchronous function module in the second kernel configuration information acquired in the step S401.

More specifically in the step S401, for example, the guest operating system notifies a synchronous function module of the guest operating system through the callback function in the system switching module therein to acquire corresponding information of the second kernel configuration information. Then the synchronous function module, by means of a communication between its front end in the guest operating system and its back end in the host operating system, allow the back end to read or acquire the information involved in the synchronous function module in the second kernel configuration information through an interface provided for the synchronous function module by the host operating system.

More specifically in the step S402, if the information involved in the synchronous function module in the second kernel configuration information thus acquired in the step S401 is different from the information involved in the synchronous function module in the first kernel configuration information in the guest operating system, the system switching module triggers the synchronous function module to report an event to a corresponding service in the user space to notify that the kernel configuration information corresponding to the synchronous function module is changed and then to synchronize the information involved in the synchronous function module in the first kernel configuration information and the information involved in the synchronous function module in the second kernel configuration information to thereby complete the process of synchronizing the first kernel configuration information with the second kernel configuration information in the step S402.

After the Step 301 and the Step 302 are executed, if detecting that any operating system is switched to run from the background to the foreground, kernel information in a system service can also be updated according to the kernel information in the kernel of the any operating system.

Herein, the any operating system can be the host operating system, or can be a guest operating system, and the system service is configured to provide the kernel configuration information for an application.

For example, after a guest operating system is switched to run from the background to the foreground, the guest operating system can synchronize the kernel configuration information in the kernel of the host operating system to the guest operating system (i.e. synchronizing the second kernel configuration information in the kernel of the host operating system to the first kernel configuration information in the kernel of the guest operating system), then the kernel information in the system service may further be synchronized with the first kernel configuration information of the guest operating system.

In addition, if it is only monitored that one of the at least one guest operating system runs in the foreground, an application program interface (API) provided by the host operating system can be operated by the one of the at least one guest operating system. Herein, the application program interface (API) is configured to provide a means for modifying the kernel information in the kernel of the host operating system. For example, when an application program in the one of the at least one guest operating system runs, the kernel information in the kernel of the host operating system may be modified through the application program interface (API).

By means of the above kernel configuration information management method, the following beneficial effects can be realized.

Upon detecting that a guest operating system is switched to run from foreground to background, for example, in a hypervisor corresponding to the guest operating system, the kernel configuration information in the kernel of the guest operating system is synchronized to the kernel of the host operating system, whereas upon detecting that a guest operating system is switched to run from background to foreground in the hypervisor corresponding to the guest operating system, the kernel configuration information in the kernel of the host operating system is synchronized to the kernel of the guest operating system. Thereby, the issue of non-synchronization between the kernel configuration information of the foreground-running guest operating system and the kernel configuration information in the kernel of the host operating system that is associated with current technologies can be effectively addressed and resolved.

On the basis of a substantially same inventive concept, the present disclosure further provides a kernel configuration information management device. A working principle of the kernel configuration information management device is substantially in accordance with the method shown in FIG. 3, so that implementation of the kernel configuration information management device may be referred to implementation of the method shown in FIG. 3, and will thus not be elaborated herein.

Figure 5A:
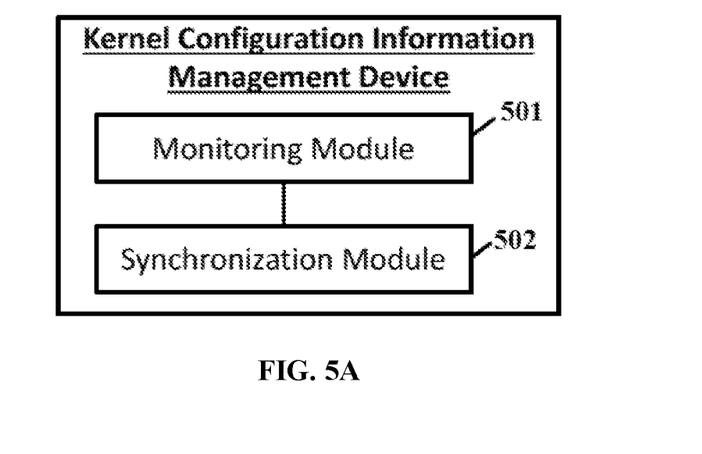
FIG. 5A is a structure diagram of a kernel configuration information management device according to some embodiment of the disclosure.

Referring to FIG. 5A, the kernel configuration information management device includes a monitoring module 501 and a synchronization module 502.

The monitoring module 501 is configured to monitor whether there is a change of a current system state of any one guest operating system (i.e. the step S301); and the synchronization module 502 is configured to synchronize, if detecting that the current system state of the any one guest operating system is switched from a foreground to a background, the first kernel configuration information in the kernel of the any one guest operating system to the second kernel configuration information in the kernel of the host operating system, or to synchronize, if detecting that the current system state of the any one guest operating system is switched from a background to a foreground, the second kernel configuration information in the kernel of the host operating system to the first kernel configuration information in the kernel of the any one guest operating system.

Figure 5B:
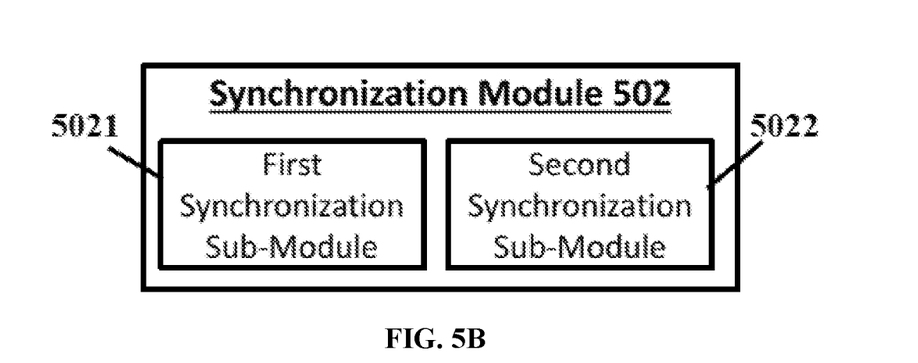
FIG. 5B is a structure diagram of the synchronization module shown in FIG. 5A.

Further as shown in FIG. 5B, the synchronization module 502 can further include a first synchronization sub-module 5021 and a second synchronization sub-module 5022.

The first synchronization sub-module 5021 is configured to synchronize the first kernel configuration information in the kernel of the any one guest operating system to the second kernel configuration information in the kernel of the host operating system if the current system state of the any one guest operating system is detected to switch from a foreground to a background; whereas the second synchronization sub-module 5022 is configured to synchronize the second kernel configuration information in the kernel of the host operating system to the first kernel configuration information in the kernel of the any one guest operating system, if the current system state of the any one guest operating system is detected to switch from a background to a foreground.

Optionally, according to some embodiments of the disclosure, the kernel configuration information management device further includes an updating module, which is configured to update kernel information in a system service based on the kernel information in the kernel of any operating system that is detected to switch to run from the background to the foreground. Herein, the system service is configured to provide the kernel configuration information for an application.

Further optionally, according to some other embodiments of the disclosure, the kernel configuration information management device further includes a processing module, which is configured to, operate an application program interface (API) provided by the host operating system if it is only monitored that any one guest operating system runs in the foreground. Herein, the application program interface (API) is configured to provide a means for modifying the kernel information in the kernel of the host operating system.

The present disclosure is described with reference to one or more flow charts and/or block diagrams of the kernel configuration information management method and the kernel configuration information management method device (or system) according to the various embodiments described above. It is to be understood that each step in a flow chart and/or each block in a block diagram may be implemented by one or more computer programs. The one or more computer programs may be provided for a universal computer, a dedicated computer, an embedded processor, or a processor of another programmable data processing device, so that a device for realizing a function specified in one or multiple steps in the flow charts and/or one or multiple blocks in the block diagrams is generated by the instructions executed through the computer or the processor of the other programmable data processing device.

The one or more computer programs may be stored in a computer-readable memory capable of guiding a computer or another programmable data processing device to work in a specific manner, so that an electronic product including an instruction device may be generated by the instructions stored in the computer-readable memory, the instruction device realizing the function specified in one flow or multiple flows in the flow charts and/or one block or multiple blocks in the block diagrams.

The one or more computer programs may further be loaded into a memory of the computer or the another programmable data processing device, so that a series of operation steps can be executed in the memory of the computer or the other programmable data processing device to thereby generate processes for realizing the function specified in one or multiple steps in the flow charts and/or one or multiple blocks in the block diagrams.

Figure 6:
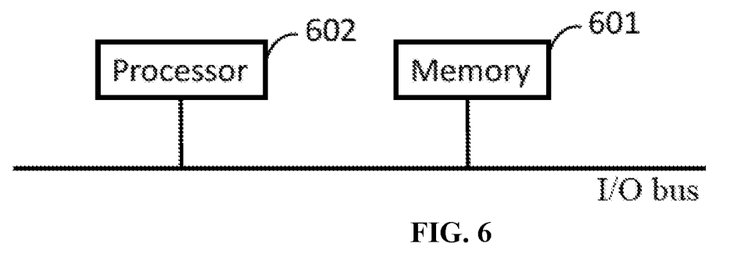
FIG. 6 is a structure diagram of an electronic apparatus according to some embodiment of the disclosure.

As such, on another aspect of the present disclosure, an electronic apparatus is further provided. Referring to FIG. 6, the electronic apparatus includes a memory 601 and at least one processor 602 (for conciseness, only one processor 602 is shown in the figure). The memory 601 is connected with the at least one processor 602 through a communication bus (i.e. "I/O bus" in FIG. 6). The at least one processor 602 is configured to execute one or more computer programs stored in the memory, and the one or more computer programs contain computer-executable instructions used for implementing the kernel configuration information management method as mentioned above.

The electronic apparatus may optionally further include a computer-readable storage medium storing the one or more computer programs. Herein, the computer-readable storage medium may include a volatile, non-volatile, movable, or unmovable medium that is implemented by using any method or technology, and may be configured to store information such as a computer readable instruction, a data structure, a program module, or other data. The storage medium includes a RAM, a ROM, an EPROM, an EEPROM, a flash memory, or other solid storage technologies, a CD-ROM, a DVD or other optical storage, a cassette, a magnetic tape, a disk storage or other magnetic storage devices. A person skilled in the art may know that the storage medium described herein is not limited to the foregoing.

On yet another aspect of the disclosure, a computer program product used in combination with an electronic apparatus is further provided. The computer program product includes one or more computer programs embedded into a computer-readable storage medium, and the one or more computer programs contain instructions configured to enable the electronic apparatus to execute in order to implement the kernel configuration information management method as mentioned above. The computer program product may be in a form of a non-transitory computer storage medium storing the one or more computer programs.

It is noted that those of ordinary skills in the art shall know that the present disclosure may be provided in a form of a pure hardware embodiment, a pure software embodiment or a software and hardware-mixed embodiment.

Throughout the disclosure, each of the terms "module," "sub-module," or alike, is referred to as a computer-implemented functional entity, which comprises at least one processor and a memory, wherein the memory is configured to store a software program (i.e. computer codes or executable instructions), and the at least one processor is configured to perform a calculation based on the software program stored in the memory to thereby perform a task carrying out the prescribed functionality. Furthermore, the at least one processor may include one or more controllers, general processors, specialized processors, coprocessors, etc., and the at least one processor can be arranged in a parallel processing structure and/or multiprocessing structure. In addition, each of the above terms may be a general computer having the software program, or can be a hardware computing device specifically designed for such a task. The computer and the hardware computing device can be locally arranged, or can be remotely arranged, such as on an intranet, an internet, or in a cloud.

Throughout the disclosure, each of a method, a step, a sub-step, a process and a feature, etc., may be implemented as part of an operating system or a specific application, component, program, object, module, or series of instructions referred to as "programs". For example, one or more programs may be used to execute specific processes described herein. The programs typically comprise one or more instructions in various memory and storage devices in a computer system that, when read and executed by at least one processor, cause the computer system to perform operations to execute the method, the step, the sub-step, the process, and the feature, etc. Each of a method, a step, a sub-step, a process and a feature, etc., may be implemented in software, firmware, hardware (e.g., an application specific integrated circuit), or any combination thereof.

It will also be understood that, ordinal indicators, such as "first," "second," and etc., as used in the specification and the claims to refer to various elements (such as components, structures, or method steps, etc.), are not meant to be construed to indicate any specific elements, or any particular order or configuration to such elements, but are only used to distinguish one element from another. These elements, however, should not be limited by the use of these ordinal indicators. For example, a first module could be termed a second module, and similarly, a second module could be termed a first module without departing from the scope of the various described embodiments. The first module and the second module are both modules, but they are not the same module.

As used in this specification and the appended claims, the singular terms "a", "an", and "the" include both singular and plural references, and thus could mean "one or more" unless otherwise specified or indicated by context. For example, a reference to "an apparatus" or "a composition" should be interpreted to mean "one or more apparatuses" or "one or more compositions," respectively.

As used herein, the term "if" is, optionally, construed to mean "when" or "upon" or "in response to determining" or "in response to detecting," depending on the context. Similarly, the phrase "if it is determined" or "if a stated condition or event is detected" is, optionally, construed to mean "upon determining" or "in response to determining" or "upon detecting the stated condition or event" or "in response to detecting the stated condition or event," depending on the context.

Although the preferred embodiments of the present disclosure have been described, those skilled in the art, once learning about basic concepts taught by the present disclosure, may make other variations and modifications to these embodiments. Therefore, it is intended to interpret claims that are appended herewith to include the preferred embodiments and all the variations and modifications falling within the scope of the present disclosure.

The invention claimed is:

1. A method for managing kernel configuration information in an electronic apparatus having multiple operating systems, wherein the multiple operating systems comprise a host operating system and at least one guest operating system, the method comprising:
monitoring whether there is a change of a present system state of any one of the at least one guest operating system; and
synchronizing first kernel configuration information in a kernel of the any one of the at least one guest operating system to second kernel configuration information in a kernel of the host operating system if detecting that the present system state of the any one of the at least one guest operating system is switched from a foreground state to a background state; or
synchronizing second kernel configuration information in a kernel of the host operating system to first kernel configuration information in a kernel of the any one of the at least one guest operating system if detecting that the present system state of the any one of the at least one guest operating system is switched from a background state to a foreground state.

2. The method of claim 1, wherein each of the multiple operating systems comprises a system switching module configured to record a present system state thereof, wherein the monitoring whether there is a change of a present system state of any one of the at least one guest operating system comprises:
monitoring a content recorded in a system switching module corresponding to the any one of the at least one guest operating system.

3. The method of claim 2, wherein the synchronizing second kernel configuration information in a kernel of the host operating system to first kernel configuration information in a kernel of the any one of the at least one guest operating system comprises:
acquiring the second kernel configuration information by notifying a synchronous function module of the at least one guest operating system through a callback function in the system switching module corresponding to the any one of the at least one guest operating system; and
synchronizing the first kernel configuration information with the second kernel configuration information by means of a service corresponding to the synchronous function module in a user space corresponding to the any one of the at least one guest operating system.

4. The method of claim 3, wherein the synchronous function module comprises a front end in the any one of the at least one guest operating system and a back end in the host operating system, wherein the acquiring the second kernel configuration information comprises:
reading, through a communication between the front end and the back end, information involved in the synchronous function module in the second kernel configuration information in the kernel of the host operating system through an interface provided for the synchronous function module by the host operating system.

5. The device of claim 4, wherein the back end is further configured not to allow access to, or operations over, the interface when the any one of the at least one guest operating system is run in the background.

6. The method of claim 4, wherein the synchronizing the first kernel configuration information with the second kernel configuration information comprises:
detecting whether there is a difference between the information involved in the synchronous function module in the second kernel configuration information and information involved in the synchronous function module in the first kernel configuration information; and
triggering, by means of the system switching module, the synchronous function module to report an event to a corresponding service in the user space to thereby synchronize the information involved in the synchronous function module in the first kernel configuration information with the information involved in the synchronous function module in the second kernel configuration information, if detecting that there is a difference.

7. The method of claim 1, further comprising an initialization process prior to the monitoring whether there is a change of a present system state of any one of the at least one guest operating system, the initialization process comprising:
  setting, upon booting of the host operating system, a present system state of the host operating system as a foreground state, and registering a callback function for each synchronous function module in the host operating system; and
  setting, upon booting of any of the at least one guest operating system, a present system state of the any of the at least one guest operating system as a background state, and registering a callback function for each synchronous function module of the any of the at least one guest operating system in a system switching module corresponding to the any of the at least one guest operating system.

8. The method of claim 1, further comprising:
  if detecting that one of the multiple operating systems is switched to run to a foreground, updating kernel information in a system service according to kernel information in the kernel of the one of the multiple operating systems.

9. The method of claim 1, further comprising:
  if only detecting that one of at least one guest operating system is run at a foreground, allowing an application program in the one of at least one guest operating system to operate over an application program interface (API) provided by the host operating system to thereby modify kernel information in the kernel of the host operating system.

10. An electronic apparatus, having multiple operating systems, wherein the multiple operating systems comprise a host operating system and at least one guest operating system, the electronic apparatus comprising:
  a memory and at least one processor, the memory being connected with the at least one processor through a communication bus, the at least one processor being configured to execute one or more computer programs stored in the memory, wherein
  the one or more computer programs contain computer-executable instructions used for implementing a method for managing kernel configuration information to perform the steps of:
    monitoring whether there is a change of a present system state of any one of the at least one guest operating system; and
    synchronizing first kernel configuration information in a kernel of the any one of the at least one guest operating system to second kernel configuration information in a kernel of the host operating system if detecting that the present system state of the any one of the at least one guest operating system is switched from a foreground state to a background state; or
    synchronizing second kernel configuration information in a kernel of the host operating system to first kernel configuration information in a kernel of the any one of the at least one guest operating system if detecting that the present system state of the any one of the at least one guest operating system is switched from a background state to a foreground state.

11. The electronic apparatus of claim 10, wherein each of the multiple operating systems comprises a system switching module configured to record a present system state thereof, wherein the monitoring whether there is a change of a present system state of any one of the at least one guest operating system comprises:
  monitoring a content recorded in a system switching module corresponding to the any one of the at least one guest operating system.

12. The electronic apparatus of claim 11, wherein the synchronizing second kernel configuration information in a kernel of the host operating system to first kernel configuration information in a kernel of the any one of the at least one guest operating system comprises:
  acquiring the second kernel configuration information by notifying a synchronous function module of the at least one guest operating system through a callback function in the system switching module corresponding to the any one of the at least one guest operating system; and
  synchronizing the first kernel configuration information with the second kernel configuration information by means of a service corresponding to the synchronous function module in a user space corresponding to the any one of the at least one guest operating system.

13. The electronic apparatus of claim 12, wherein the synchronous function module comprises a front end in the any one of the at least one guest operating system and a back end in the host operating system, wherein the acquiring the second kernel configuration information comprises:
  reading, through a communication between the front end and the back end, information involved in the synchronous function module in the second kernel configuration information in the kernel of the host operating system through an interface provided for the synchronous function module by the host operating system.

14. The electronic apparatus of claim 13, wherein the back end is further configured not to allow access to, or operations over, the interface when the any one of the at least one guest operating system is run in the background.

15. The electronic apparatus of claim 13, wherein the synchronizing the first kernel configuration information with the second kernel configuration information comprises:
  detecting whether there is a difference between the information involved in the synchronous function module in the second kernel configuration information and information involved in the synchronous function module in the first kernel configuration information; and
  triggering, by means of the system switching module, the synchronous function module to report an event to a corresponding service in the user space to thereby synchronize the information involved in the synchronous function module in the first kernel configuration information with the information involved in the synchronous function module in the second kernel configuration information, if detecting that there is a difference.

16. The electronic apparatus of claim 10, further comprising an initialization process prior to the monitoring whether there is a change of a present system state of any one of the at least one guest operating system, the initialization process comprising:
  setting, upon booting of the host operating system, a present system state of the host operating system as a foreground state, and registering a callback function for each synchronous function module in the host operating system; and setting, upon booting of any of the at least one guest operating system, a present system state of the any of the at least one guest operating system as a background state, and registering a callback function for each synchronous function module of the any of the at least one guest operating system in a system switching module corresponding to the any of the at least one guest operating system.

17. The electronic apparatus of claim 10, wherein the one or more computer programs contain computer-executable instructions used for implementing a method for managing kernel configuration information to further perform the steps of:
   if detecting that one of the multiple operating systems is switched to run to a foreground, updating kernel information in a system service according to kernel information in the kernel of the one of the multiple operating systems.

18. The electronic apparatus of claim 10, wherein the one or more computer programs contain computer-executable instructions used for implementing a method for managing kernel configuration information to further perform the steps of:
   if only detecting that one of at least one guest operating system is run at a foreground, allowing an application program in the one of at least one guest operating system to operate over an application program interface (API) provided by the host operating system to thereby modify kernel information in the kernel of the host operating system.

19. A computer program product used in combination with an electronic apparatus, comprising:
   one or more computer programs embedded into a computer-readable storage medium, wherein the one or more computer programs contain instructions configured to enable the electronic apparatus to execute in order to implement a method for managing kernel configuration information to perform the steps of:
   monitoring whether there is a change of a present system state of any one of the at least one guest operating system; and
   synchronizing first kernel configuration information in a kernel of the any one of the at least one guest operating system to second kernel configuration information in a kernel of the host operating system if detecting that the present system state of the any one of the at least one guest operating system is switched from a foreground state to a background state; or
   synchronizing second kernel configuration information in a kernel of the host operating system to first kernel configuration information in a kernel of the any one of the at least one guest operating system if detecting that the present system state of the any one of the at least one guest operating system is switched from a background state to a foreground state.

20. The computer program product of claim 19, wherein each of the multiple operating systems comprises a system switching module configured to record a present system state thereof, wherein the monitoring whether there is a change of a present system state of any one of the at least one guest operating system comprises:
   monitoring a content recorded in a system switching module corresponding to the any one of the at least one guest operating system.

* * * * *